United States Patent Office 3,840,665
Patented Oct. 8, 1974

---

3,840,665
TOPICAL ANTIFUNGAL 4-NITROISOTHIAZOLE COMPOSITIONS
Darrell E. O'Brien, Mission Viejo, and Roland K. Robins and Anthony H. Albert, Santa Ana, Calif., assignors to ICN Pharmaceuticals, Inc.
No Drawing. Filed Aug. 16, 1971, Ser. No. 172,271
Int. Cl. A01n 9/12
U.S. Cl. 424—270        2 Claims

ABSTRACT OF THE DISCLOSURE

Topical preparations containing effective fungus-inhibiting proportions of compounds of formula:

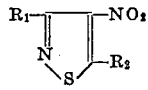

wherein $R_1$ is hydrogen or methyl and $R_2$ is hydrogen or halogen with the proviso that where $R_2$ is hydrogen, $R_1$ is hydrogen as well are disclosed.

FIELD OF THE INVENTION

This invention relates to compositions useful in the topical treatment of fungus infections, and more specifically relates to such compositions which contain particular 4-nitroisothiazoles.

BACKGROUND OF THE INVENTION

Various nitrothiazoles have heretofore been tested or proposed for testing of biological activity. Thus, in *J. Med. Chem.* 12, 374 (1969) Asato et al. reported the in vitro anti-fungal activity of various derivatives of 2-nitro - 5 - thiazolecarboxaldehyde and 5-nitro-2-thiazolecarboxaldehyde. In *Abstracts of Papers* 12th Nat. Med. Chem. Sym., Seattle, Wash., June 22–25, 1970, p. 9a, Elslager collects data on the antischistosome properties of niridazole and related compounds. In *Studia Univ. Babes-Bolzai Ser. Chem. II*, 29 (1966) [CA 67, 3019 (1967)] 2-halo-4-methyl-5-nitrothiazoles are prepared as candidates for biological testing.

Biocidal 3-hydroxy isothiazoles have been described in French patents 1,555,415 and 1,555,414; 3-isothiazolinones have also been described as biocides. *Id.* While various 4-nitroisothiazoles have been described by Slack and others in *J. Chem. Soc.* 3061 (1959), 446 (1964) and 7277 (1965), little has been reported on their biological activity. Several derivatives of the p-aminobenzenesulphonamido isothiazoles not containing a nitro group are reported in U.S. Pat. 2,839,529 as more active than sulfathiazole. However, no antimicrobial activity has previously been assigned to the 4-nitroisothiazoles.

BRIEF SUMMARY OF THE INVENTION

It has now been found that 4-nitroisothiazoles of formula:

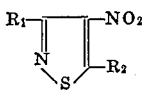

wherein $R_1$ is hydrogen or methyl and $R_2$ is halogen or hydrogen (with the proviso that when $R_2$ is hydrogen $R_1$ is hydrogen) possess significant broad spectrum antifungal activity.

DESCRIPTION OF PREFERRED EMBODIMENTS OF THE INVENTION

Certain of the compounds employed in preferred embodiments of the invention are known *per se*. Thus, 5-bromo-3-methyl-4-nitroisothiazole (1) is prepared by the procedure of Adams and Slack, *J. Chem. Soc.* 3061 (1959) from 5-amino - 3 - methylisothiazole. 5-Iodo-3-methyl-4-nitroisothiazole (2) is obtained from (1) by iodide displacement, as is known. The previously unreported 5-chloro-3-methyl-4-nitroisothiazole (3) is obtained by a route analogous to that for (1). Isothiazole is brominated, then nitrated to obtain after chromographic separation from 4,5 - dibromoisothiazole the heretofore unknown 5-bromo-4-nitroisothiazole (4). The 5-iodo and 5-chloro analogs of (4) are obtained as in the case of the 3-methyl-5-halo compounds discussed above. Nitration of isothiazole yields 4-nitroisothiazole (5).

The invention is further described and illustrated in the following examples, in which all parts and percentages are by weight and all temperatures in degrees centigrade unless otherwise stated. Melting points were taken on a Thomas-Hoover melting point apparatus and are uncorrected. Infra-red and mass spectra were determined on a Perkin-Elmer 257 grating infra-red spectrophotometer and on a Perkin-Elmer 270 double focusing mass spectrophotometer respectively. Where analyses are indicated only by symbols of the elements or functions, analytical results obtained for those elements or functions were within ±0.4% of the theoretical values.

EXAMPLE 1

Preparation of 4-Nitroisothiazole

A solution of isothiazole (5.0 g.) in conc. $H_2SO_4$ (15 ml.) and 90% $HNO_3$ (3 ml.) was heated at 110–115° for 16 hours, cooled to room temperature, and poured onto ice. The resulting 4-nitroisothiazole (5.8 g., 76%) was collected and dried. Recrystallization from aqueous ethanol afforded a colorless product melting at 86–7°.

EXAMPLE 2

Preparation of 5-Bromo-3-Methyl-4-Nitroisothiazole (A) A solution of 5-amino-3-methylisothiazole (30 g.) in 86% $H_3PO_4$ (100 ml.) was treated with conc. $HNO_3$ (50 ml.) at 5°. The resulting white suspension wis diazotized at −3 to −5° with $NaNO_2$ (18.2 g.) dissolved in $H_2O$ (25 ml.). After stirring for an additional 30 min., the cold suspension was slowly added to a cold solution of cuprous bromide (75 mg.) in 48% HBr (150 ml.). Following an hour stirring at 0° the mixture was adjusted to pH 4–5 and steam distilled. Extraction of the distillate with ether gave 17.7 g. (30%) of 5-bromo-3-methylisothiazole, a light yellow liquid, b.p. 74–6°/23 mm.

(B) A solution of 5-bromo-3-methylisothiazole (1.5 g.) in conc. $H_2SO_4$ (5 ml.) and 90% $HNO_3$ (1 ml.) was stirred at *ca.* 115° for 3 hours then cooled to room temperature and poured onto ice. The resulting solid was collected, washed with water, and dried yielding 1.5 g. (80%) of the intended product, a yellow solid; m.p. 75–7°.

EXAMPLE 3

Preparation of 5-Iodo-3-Methyl-4-Nitroisothiazole

A solution of 5-bromo-3-methyl-4-nitroisothiazole (500 mg.), NaI (800 mg.), and acetic acid (0.3 ml.) in acetone (4 ml.) was heated at 100° in a sealed tube for 2 hours then allowed to stand at room temperature for 18 hours. The resulting solid was removed by filtration and to the wine-red solution was added sodium metabisulfite (0.5 g.) in $H_2O$ (17 ml.). The resulting yellow solid was collected and dried: 421 mg. (70%), m.p. 110–18°. Two recrystallizations from pet. ether (60–80°) gave the product; m.p. 122–3°.

EXAMPLE 4

Preparation of 5-Chloro-3-Methyl-4-Nitroisothiazole (A) To a solution of 5-amino-3-methylisothiazole hydrochloride (7.5 g.) in 86% phosphoric acid (20 ml.) was added conc. nitric acid (10 ml.), while the temperature was maintained below 10°. The resulting stirred suspension was slowly diazotized with $NaNO_2$ (4.0 g.) in water (6 ml.) at 0–5°. After the addition, the orange-red suspension was stirred in an ice bath for an additional 2.5 hrs., then cautiously poured into a stirred solution of cuprous chloride (6.0 g.) in conc. hydrochloric acid (30 ml.) held below 5°. Following 16 hrs. of stirring at room temperature, the reaction mixture was adjusted to pH 4–5 and steam distilled. The distillate which collected (125 ml.) was extracted with ether, which was dried over $MgSO_4$. Removal of the solvent *in vacuo* gave 1.8 g. (27%) 5-chloro-3-methylisothiazole, a light yellow liquid; b.p. 145–7°.

(B) A mixture of 5-chloro-3-methylisothiazole (0.90 g.), conc. $H_2SO_4$ (4 ml.), and 90% nitric acid (0.9 ml.) was heated at ca. 120° for 5 hours with stirring. After cooling to room temperture the reaction mixture was allowed to sit for 15 hours, then was poured over ice. Filtration produced 0.70 g. (58%) colorless solid; m.p. 54–6.5°. Recrystallization from absolute ethanol followed by sublimation produced an analytical sample of the intended product, m.p. 57–8°.

*Analysis.*—($C_4H_3ClN_2O_2S$) C,H,N.

EXAMPLE 5

Preparation of 5-Bromo-4-Nitroisothiazole

Into 21.8 gm. of the distilled 5-bromoisothiazole product obtained according to the procedure of M. P. L. Caton *et al, J. Chem. Soc.* 446 (1964) was slowly (20 minutes) dropped a mixture of conc. $H_2SO_4$ (60 ml.) and 90% $HNO_3$ (23 ml.), while the reaction was stirred and cooled in an ice bath. The temperature of the reaction mixture was slowly raised to 110° where it was maintained for 5 hours, then allowed to cool to room temperature and stirred for 16 hours. After pouring the reaction onto ice the resulting light yellow solid (15.4 g.) was collected, washed with water, and dried over NaOH under a slight vacuum. This product was then chromatographed on 450 g. silica gel (Baker 3405). Elution with pet. ether (60–90°) gave 4,5-dibromo isothiazole (ca. 6 g.), sublimation of which gave an analytically pure sample; m.p. 53–5°.

*Analysis.*—($C_3HBr_2NS$) C,H,N.

Further elution with chloroform-pet. ether (1:2) produced 5-bromo-4-nitroisothiazole (m.p. 32–5°) which also was sublimed to give an analytical sample of the intended product, 5.5 g., m.p. 37–8°.

*Analysis.*—($C_3HBrN_2O_2S$) C,H,N.

In the following qualitative and quantitative assays of antifungal activity against a broad spectrum of organisms, the compounds of the invention are variously compared to a number of closely related analogs outside the scope of the invention and to several known antifungal agents. The organisms employed in testing are identified in the following table.

TABLE I.—ORGANISMS EMPLOYED IN ACTIVITY ASSAY

| No. | Organism | Remarks |
| --- | --- | --- |
| 1 | *Aspergillus niger* | An organism of low pathogenicity related to *A. fumigatus*, the latter causing keratitis of the eye and severe pulmonitis. |
| 2 | *Candida albicans* | Causes a variety of clinical syndromes, most commonly superficial vaginal injection. |
| 3 | *Cryptococcus diffluens* | Used as a model of pathogenic *C. neoformons*, which latter causes human meningoencephalitis. |
| 4 | *Neurospora crassa* | A model for spore-forming fungi. |
| 5 | *Streptomyces griseus* | Common laboratory contaminant. |
| 6 | *Saccharomyces cerevisiae* | A non-pathogenic organism tested as a sexually reproducing yeast. |
| 7 | *Microsporum lanosum* | |
| 8 | *Microsporum nannum* | |
| 9 | *Trichophyton mentagrophytes*-R. | The *Microsporum* and *Trichophyton* families are responsible for many of the superficial skin injections. |
| 10 | *Trichophyton rubrum* | |
| 11 | *Trichophyton tonsurans*-B | |
| 12 | *Trichophyton tonsurans*-C | |

EXAMPLE 6

Various of the organisms referred to above are implicated in other clinical disorders as well and it will be appreciated that even normally non-pathogenic organisms can be troublesome, e.g., to patients undergoing immunosuppressive therapy. The compounds are qualitatively assayed for activity according to the following protocol. The fungus is transferred from a stock culture, suspended in a nutrient broth and incubated overnight. After mixing, a small aliquot (ca. 0.02 ml.) of the liquid culture is transferred to a second tube of a nutrient broth and again mixed. One such tube is prepared for each petri dish to be inoculated.

Prior to inoculation, a solid nutrient medium is prepared and poured in the petri dish, allowed to cool and harden, and then inoculated by pouring the previously prepared suspension of micro-organism on the surface. After approximately 5 minutes, the suspension is poured off, and the petri dish is inverted and allowed to dry for 45–60 min.

The petri dishes have a grid of 1 cm. squares impressed into the bottom half which contains the nutrient medium. The rows and columns of squares are identified by alphabetic characters (A–G) and numerals (1–7) respectively. Each test compound may thus be assigned a singular location (e.g., C–3, A–5, etc.).

A flame-cleaned microspatula is used to transfer enough compound to cover a small pin head to its given location after inoculation of the organism as above. Compounds are tested on three petri dishes for each organism.

The dishes are incubated at room temperature for 24–48 hours. An active compound inhibits the growth of the organism and so a circular clear area (zone of inhibition) is seen around the compound when viewed against a dark background or in an oblique light.

Zones of inhibition are measured by eye and are as follows:

| | |
| --- | --- |
| 0 none. | 4+ 1.5 cm. |
| ± 0.25 cm. | 5+ 2.0 cm. |
| + 0.5 cm. | 6+ 2.5 cm. |
| 2+ 0.75 cm. | 7+ 3.0 cm. |
| 3+ 1.0 cm. | 8+ ca. ½ dish |

Parentheses ( ) indicate zone size with light growth.

Following the above procedure, the data reported in Table II is taken:

TABLE II.—COMPARATIVE AGAR PLATE ANTI-FUNGAL ACTIVITY

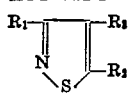

| Compound | | | Organism | | | | | |
|---|---|---|---|---|---|---|---|---|
| No. | R₁ | R₃ | R₂ | 1 | 2 | 3 | 4 | 5 | 6 |
| 1 | CH₃ | NO₂ | Br | 7+ | 7+ | 7+ | 8+ | 6+ | (5+) |
| 2 | CH₃ | NO₂ | I | 6+ | 5+ | 6+ | 5+ | 5+ | 5+ |
| 3 | CH₃ | NO₂ | Cl | 6+ | +6 | 6+ | 6+ | 8+ | 0 |
| 4 | H | NO₂ | Br | (6+) | (6+) | 6+ | 7+ | (6+) | 6+ |
| 5 | H | NO₂ | H | 4+ | 3+ | 3+ | 5+ | p | 3+ |
| 6* | CH₃ | NO₂ | N(Me)₂ | 0 | ± | ± | ± | 0 | 0 |
| 7 | CH₃ | NO₂ | CONH₂ | 0 | 0 | 0 | 3+ | 0 | 0 |
| 8 | CH₃ | NO₂ | CN | 0 | 0 | 0 | 0 | 0 | 0 |
| 9 | CH₃ | NO₂ | NHNO₂ | 0 | 0 | 0 | 0 | 2+ | 0 |
| 10 | CH₃ | NO₂ | H | 0 | ± | ± | 0 | ± | ± |
| 11 | H | H | H | 0 | + | 0 | 0 | 0 | 0 |
| 12 | CH₃ | H | Br | + | 0 | + | 0 | 0 | 0 |
| 13 | CH₃ | H | Cl | 0 | ± | 0 | 0 | 0 | + |
| 14 | CH₃ | NH₂ | Br | 0 | 0 | 0 | 0 | 0 | 0 |
| 15 | CH₃ | | | 0 | 0 | 0 | 0 | 0 | 0 |

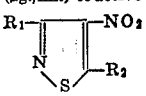

\* Compounds 6–15 are outside the scope of the invention and are presented for comparison only.

As will be seen from Table II, compounds according to the invention differ markedly in antifungal activity from their closely related analogs 6–15. The criticality of the nitro group is seen by comparison of compounds 1–3 and 5 to compounds 11–15. Thus, relative to the broad spectrum activity of compounds 1–3, little or no activity obtains when —NO₂ is replaced by hydrogen in compounds 12 and 13. The same apepars from comparison of compounds 5 and 6. Comparison of pyridine and nitrobenzene by Mosher "The Chemistry of the Pyridines" 1 *Heterocyclic Compounds* 397 John Wiley & Sons, N.Y. (1959) implies that the electron withdrawing capability of aromatic ring nitrogen is similar to that of a nitro group. However, when 5-bromo-3-methyl-1,2,4-thiadiazole (compound 15) is prepared by known procedures and tested, it is found to be totally inactive on agar plates, indicating that the nitro/group *per se* is required for antifungal activity (Cf. compound *1*). Again, when 4-aminoisothiazole (compound *14*) is prepared by reduction of the nitro group of compound 1, no activity is observed.

Comparison also suggests that in the 3-methyl-4-nitroisothiazoles the 5-positioned halogen is critical to antifungal activity. Thus, a comparison of compounds *1–3* with compounds *6–9* demonstrates that while the 5-halogenated compounds possess broad spectrum activity in high degree, but occasional and relatively lower activity obtains when other electron-withdrawing groups are substituted for halogen in the compounds of the invention. Little or no activity is observed when the halogen of compound *1* is absent (see compound *10* in Table II above). It is indeed surprising, then, that non-halogen-containing compound *5* retains a great deal of activity though differing from inactive compound *10* only in the lack of a methyl group in position 3.

EXAMPLE 7

Compounds of the invention are compared by quantitative assay to known antifungal agents according to the following protocol. A known amount of the compound is solubilized, and serially diluted (two-fold dilutions) in a nutrient broth suitable to the organism being tested. A known number of organisms is then added, mixed and incubated with constant shaking. Determinations are performed in duplicate.

The MIC (minimum inhibitory concentration) is the lowest concentration of compound preventing visible growth in the above tubes. The data reported in Table III is taken.

TABLE III

Broth dilution assay—Minimum inhibitory concentration (μg./ml.) of active 4-nitroisothiazoles compared to known anti-fungal agents*

| Compound | | Organism | | | | | | | | | |
|---|---|---|---|---|---|---|---|---|---|---|---|
| | | Yeast (MIC) 24 hours, mycological broth | | Mycelial (MIC) 24 hours, mycological broth | | | Dermatophyte (MIC), Emmons broth 2 days | | | | |
| | | | | | | | | | 7 days | | |
| | R₁ | R₂ | 2 | 3 | 6 | 1 | 4 | 7 | 8 | 9 | 10 | 11 | 12 |
| Number: | | | | | | | | | | | | |
| 1 | CH₃ | Br | 1.95 | 0.975 | 3.9 | 1.95 | 0.975 | 0.488 | 0.488 | 0.975 | 0.975 | 0.975 | 0.488 |
| | | | | | | | | | 1.95 | 3.9 | 3.9 | 1.95 | 3.9 | 1.95 |
| 3 | CH₃ | Cl | 0.975 | 7.8 | 1.95 | | | | | | 0.488 | | |
| | | | | | | | | | | | 1.95 | | |
| 2 | CH₃ | I | 0.245 | 0.245 | 0.123 | | | | | | 0.031 | | |
| | | | | | | | | | | | 0.031 | | |
| 4 | H | Br | 1.95 | 7.8 | 1.95 | | | | | | 0.975 | 1.95 | | |
| | | | | | | | | | | | 1.95 | 1.95 | | |
| 5 | H | H | 125 | 125 | 31 | 125 | 15.6 | | | | | | |
| Pyrrolnitrin | | | 62.5 | 3.9 | | | | <0.245 | 0.488 | <0.245 | 0.245 | <0.245 | <0.245 |
| | | | | | | | | 0.488 | 0.488 | <0.245 | 3.9 | 3.9 | 1.95 |
| Griseofulvin | | | N.A. | N.A. | N.A. | | | | | | 0.975 | 7.8 | 31.2 |
| | | | | | | | | | | | 3.9 | 62.4 | 62.4 |
| Tolnaftate | | | N.A. | N.A. | N.A. | | | | | | <0.001 | | |
| | | | | | | | | | | | <0.001 | | |
| Bayer b5097 | | | 0.975 | 1.95 | | | | | | | 0.975 | | |
| | | | | | | | | | | | 1.95 | | |

*N.A.=No activity.

The antifungal agents of the invention may be employed with common topical vehicles, the choice of vehicle depending upon the particular condition treated. Skin infections may be characterized as acute (weeping, hot, edematous, crusting, recent), subacute (edematous, hot, chapped) and chronic (scaling, lichenified, crusting). Ointments, by reason of their greasy base, are recommended for chronic conditions, while creams, emulsions and topical solutions are recommended for acute and subacute lesions. Unlike ointments, creams are generally water soluble and exhibit vanishing properties. Emulsions are used of necessity where treatment with plural agents is indicated, one of which is insoluble in media in which the other may be dissolved, so that plural, emulsified carrier phases are required for uniform distribution. "Topical solution" refers to a solution of active ingredient in a solvent material intermediate in viscosity between creams and easily evaporable solvents like alcohol, so that a balance of spreadability and prolongation of action is achieved. Pastes as such are not preferred for topical treatment of fungus infections, by reason of their tendency to promote anaerobic conditions at the site of infection.

As exemplary of the many topical ointment, cream and solution formulations which may be generally applied are the following combinations of materials:

Ointments a. Petrolatum without excipients.
b. Plastibase, a plasticized hydrocarbon gel available from Squibb, Inc. and comprised of polyethylene and mineral oil.

Creams a. Aqueous vanishing cream base (USP):
   Propylene glycol
   Ethyl alcohol
   Glycerol Monostearate
   Spermaceti
   Isopropyl palmitate
   Methyl and propyl paraben
b. Stearic acid
   Propylene glycol
   Sorbitan monostearate and oleate
   Polyoxyethylene sorbitan monostearate
   Citric acid
   Methyl and propyl parabens
c. Water base:
   Potassium sorbate
   Methyl and propyl parabens
   Glycerol monostearate
   Squalane
   Polysorbate 80 (USP)
   Spermaceti
   Stearyl alcohol
   Sorbital solution

Topical Solution

Polyethylene glycol 400 (USP)
Propylene glycol
Carboxymethylene
Monoamylamine
Titanium dioxide
Butylated hydroxytoluene Accordingly, then, the topical vehicles are commonly comprised of, in addition to bodying agents, humectants, saponifying agents, emulsifiers, solvents, penetrants, pH regulators, plasticizers, emollients, preservatives, hardening agents, pigments and perfumes, as is well known.

For employment against vaginal infections, topical carriers affording maximum distribution of the active agent are preferred, e.g.:

Vaginal Creams a. Glycerol monostearate
   Corn oil
   Glycerine
   Benzoic acid
   Glutamic acid
   Water
b. Glycerine
   Ethyl alcohol
   Liquid petrolatum
   Polyethylene glycol ether: fatty alcohol complex
   Paraben preservatives
   Water

Vaginal Suppositories a. Lactose
   Polyethylene glycol 400
   Polysorbate 80
   Polyethylene glycol 4000
   Glycerine
   Lactic acid
b. Polyethylene glycol
   Polyoxyethylene palmitate
   Lactic acid Topical vehicles for vaginal applications are pH-adjusted to the acid conditions under which normal bacteria flourish, so as not to debilitate bodily defense mechanisms. The art-skilled are, of course, well aware of this and other considerations involved in topical deployment of antifungal agents.

The topical preparations contain effective fungus-inhibiting proportions of the active agent, e.g., from about 0.025% to about 2% by weight, preferably 0.025% to 1%, most preferably from 0.025% to 0.1% by weight. Up to about 5% by weight may be employed in the treatment of recalcitrant conditions.

Having described the invention with reference to the preferred embodiments thereof, it will be appreciated that the invention is not limited thereto, but only to the lawful scope of the appended claims.

What is claimed is:

1. An antifungal composition for topical use comprising an ointment and an effective fungus-inhibiting proportion of a compound formula

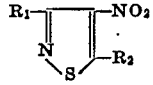

wherein $R_1$ is hydrogen or methyl and $R_2$ is hydrogen or halogen with the proviso that where $R_2$ is hydrogen $R_1$ is hydrogen.

2. The composition of claim 1 wherein $R_1$ is hydrogen and $R_2$ is halogen.

References Cited

Chemical Abstracts 54:12113a—15a (1960)
Chemical Abstracts 61:13316h (1964).

ALBERT T. MEYERS, Primary Examiner

L. SCHENKMAN, Assistant Examiner